Jan. 27, 1959 R. G. GLENN 2,870,602
AFTERBURNER EXHAUST NOZZLE VARIABLE AREA
Filed Feb. 13, 1956 3 Sheets-Sheet 1

INVENTOR.
ROBERT G. GLENN
BY
ATTORNEYS

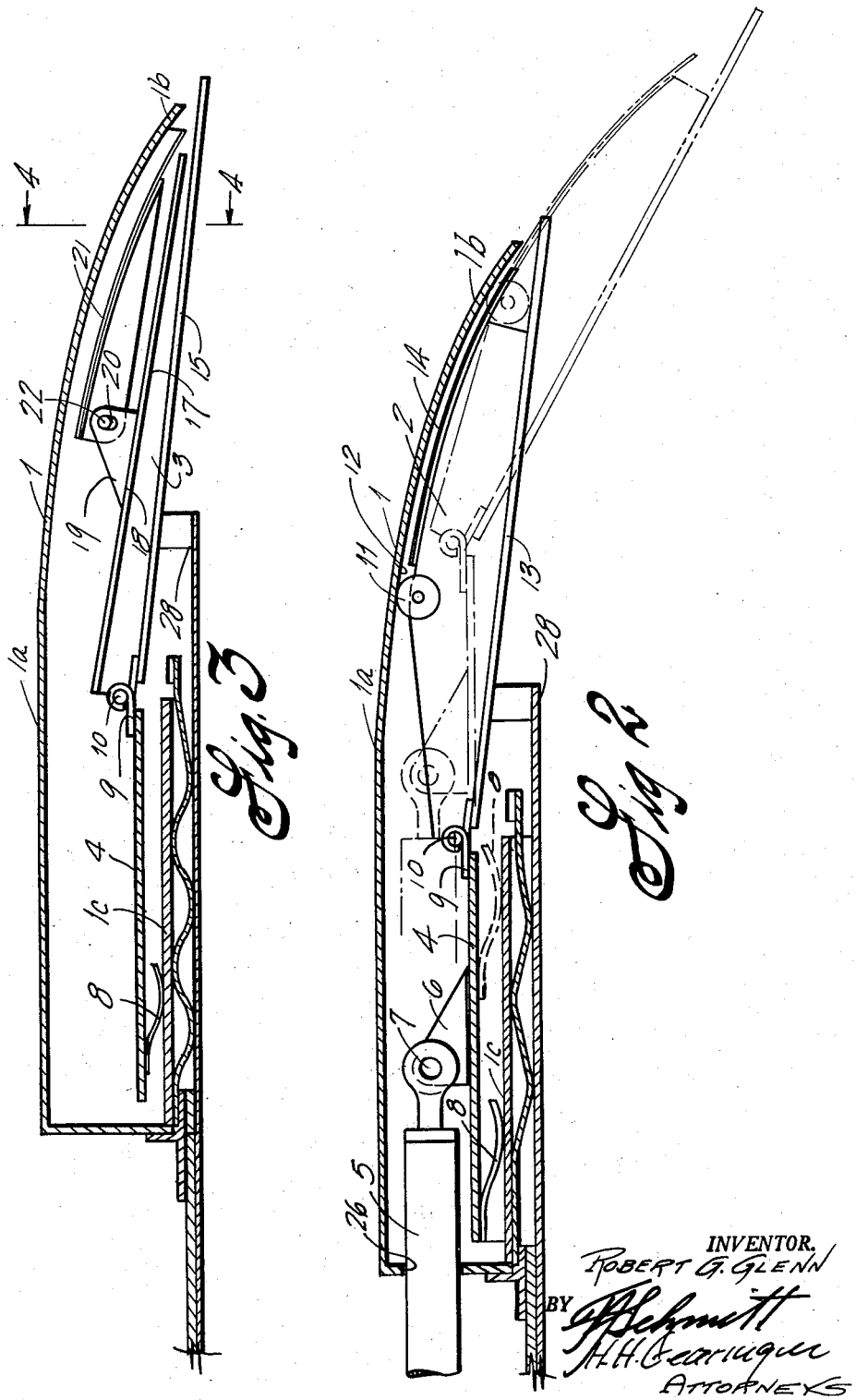

Jan. 27, 1959　　　　R. G. GLENN　　　　2,870,602
AFTERBURNER EXHAUST NOZZLE VARIABLE AREA
Filed Feb. 13, 1956　　　　　　　　　　3 Sheets-Sheet 3

INVENTOR.
Robert G. Glenn
BY
Arthur L. Collins
ATTORNEY

2,870,602

AFTERBURNER EXHAUST NOZZLE VARIABLE AREA

Robert G. Glenn, Merriam, Kans., assignor, by mesne assignments, to the United States of America as represented by the Secretary of the Navy Application February 13, 1956, Serial No. 565,279

1 Claim. (Cl. 60—35.6)

This invention relates to an afterburner of a jet engine and involves in particular a variable area exhaust nozzle for use on a jet engine.

It is known in turbo and other jet engines that one way of controlling the thrust developed by the engine is by varying the effective area of the exhaust orifice for the gases developed in the engine. Because of the extremely high pressures in this area, previous devices required an actuator which was capable of producing even higher pressures. In the instant device, advantage is taken of the pressures developed by the engine to aid in controlling the area of the exhaust nozzle.

Applicant's invention consists of a plurality of leaves positioned to form a circular opening at the exhaust end of a jet engine. These leaves are pivotally attached to a unison ring which is moved along the longitudinal axis of the jet engine. To every other leaf a roller, which bears against the engine fairing, is secured. Movement of the unison ring causes the leaves to move in and out due to the camming action of the fairing and roller to vary the effective area of the exhaust nozzle.

It is an object of this device to provide a means for rapidly controlling the area of the exhaust nozzle for a jet engine.

It is a further object of this invention to use the forces developed by the exhaust pressure to put a forward and aft thrust on the actuator to balance the gas forces and thus reduce the required actuator force.

It is a further object of this invention to provide fairing on the leaves which will permit a minimum of turbulence at the rear of the engine or base drag resulting in a higher speed for a given thrust.

Other objects and many of the attendant advantages of this invention will be readily appreciated as the same becomes better understood by reference to the following detailed description when considered in connection with the accompanying drawings wherein:

Fig. 2 is a showing of the driven leaf in section taken along the line 2—2 of Fig. 1.

Fig. 3 is a showing of the floating leaf with the leaf fairing in section taken along the line 3—3 of Fig. 1.

Figure 1:
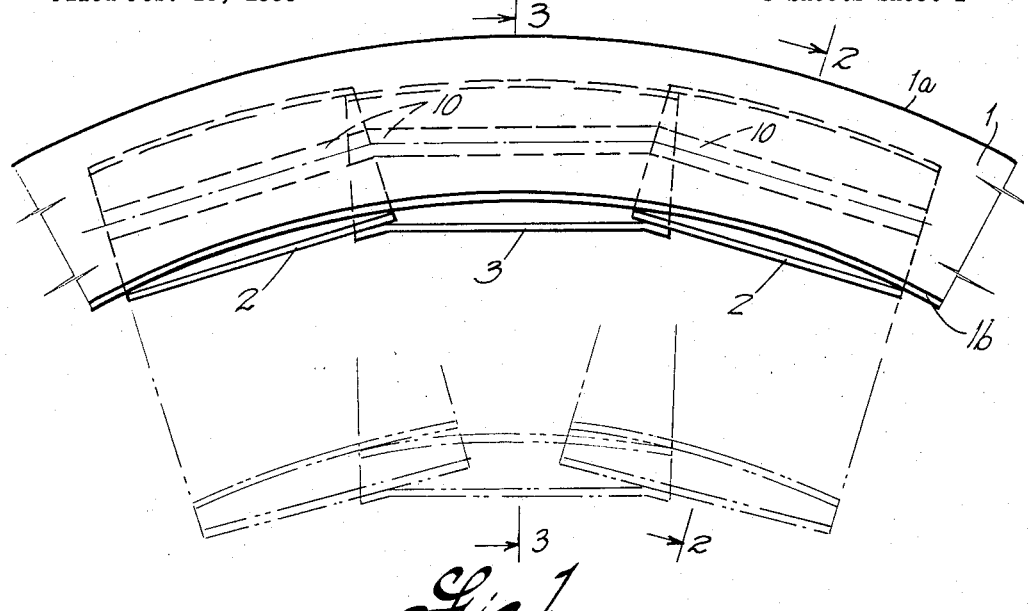
Fig. 1 is a segment of the tail section of a jet engine with the open position of the exhaust nozzle shown in full lines and the closed position shown in dotted-dash lines.
Figure 4:
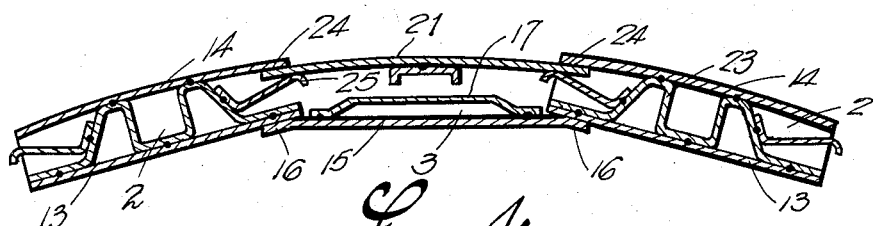
Fig. 4 is a section showing the location of the leaves taken along the line 4—4 of Fig. 3.
Figure 5:
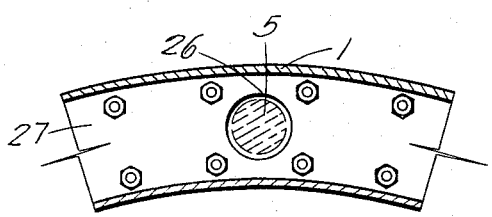
Fig. 5 is a view looking along the line 5—5 of Fig. 2.
Figure 6:
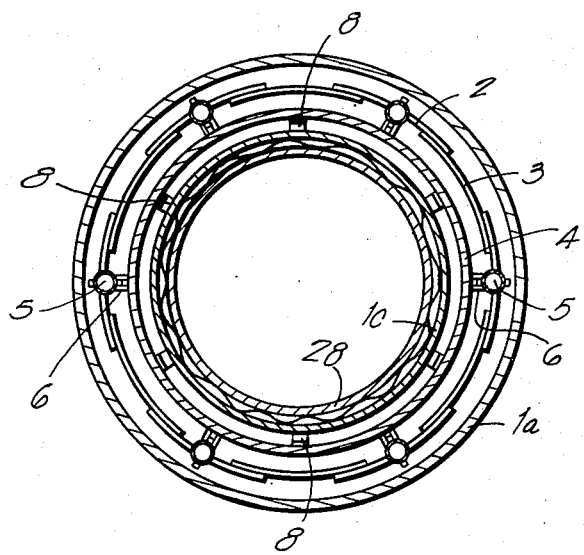
Fig. 6 is a transverse section, looking rearward, of a fully open jet engine exhaust nozzle taken substantially adjacent the forward end of the unison ring.

In the drawings there is shown a segment of the tail section of a jet engine. This segment discloses means for varying the exhaust nozzle area.

In Figure 1 there is disclosed a segment of a double wall circular casing the outer wall of which constitutes the exhaust nozzle fairing 1 of a jet engine. The fairing 1 tapers in an aftward direction from a point 1a of maximum diameter to a point 1b of minimum diameter and surrounds the exhaust nozzle area.

Located on the inner side of the fairing 1 are a plurality of driven leaves 2 and floating leaves 3. The full line position indicates the open position or maximum exhaust nozzle area and the dotted lines indicate the closed position or minimum exhaust nozzle area. The leaves are moved between the open and closed positions by a unison ring 4, as shown in Figure 2. The unison ring is moved fore and aft by two or more push-rods 5 which move through a floating seal ring 26 in partition wall 27 of the fairing 1. The push rods are pivotally connected to blocks 6 of the unison ring by the pins 7 and the unison ring rides on springs 8 bearing against the inner wall 1c of the casing and forming seals. A plurality of hinge plates 9 are secured to the unison ring completely around the exhaust nozzle. In the open position the leaves are held in position by resilient ring member 28 when the engine is not operating.

A plurality of leaves are pivotally connected to the unison ring 4 by piano type hinges 10. Every alternate leaf is a driven leaf 2 which are somewhat triangular in cross-section. Near the apex of the triangular shape, a roller 11 is mounted which is held against the fairing 12 of the casing by the gas pressures emanating from the jet engine through the exhaust nozzle and bearing on the base section 13 of the leaf. By mounting the roller near the center of the leaf a minimum cantilever action on the leaf is obtained permitting lighter structure. Also, by utilizing the exhaust nozzle fairing as a camming surface, the exhaust nozzle fairing serves a purpose other than merely a shield. Thus, weight is saved. The rearward section of the driven leaf has a curved fairing 14 fixed to it. When the leaf is in an extended position the fairing 14 serves to streamline the rear or base of the engine and reduce turbulence behind it; thus, it minimizes the resulting drag which is normally called base drag. The driven leaf is strengthened by ribs 23 mounted between the base 13 and the fairing 14.

Between each driven leaf, a floating leaf 3 is mounted. The base portion 15 of the floating leaf has angled end sections 16 which bear against the base section 13 of the driven leaf. The floating leaf is mounted on the inner side of the driven leaf and is held against the driven leaf by the gas pressures issuing from the exhaust nozzle. A strengthening rib 17, U-shaped in cross-section, extends along the full length of the longitudinal axis of the floating leaf. At approximately the midpoint of the rib 17 is secured a support 18 with upstanding ears 19 having apertures 20. A leaf fairing 21 having pins 22 is pivotally supported in the apertures 20. The floating leaf fairing bears on the inner side 24 of the driven leaf fairing and is held against the driven leaf fairing by resilient retaining tabs 25 secured to the ribs 23. The leaf fairing serves to permit a minimum base drag resulting in higher air speeds for a given thrust.

Pivotally mounting fairing 21 on the driven leaf 3 assures a seal between leaf fairings or elements 14 and 21 and elements 13 and 15—i. e. there are two seals on each lateral edge of a leaf—while permitting free sliding action between the leafs for movement of the device back and forth from open to close positions. Otherwise, a clearance, as between elements 14 on leaf 2 and element 21 on leaf 3, is required where element 21 is rigidly mounted and is spaced relative with element 15 on leaf 3. In this case only one of the mentioned seals would be obtained on each side of a leaf which would depend on the spacing of element 21 from element 15 on leaf 3 with relation to the spacing of element 14 from element 13 on leaf 2. Where the spacing on leaf 3 is smaller than on leaf 2 only the seal between elements 13 and 15 would be obtained and vice versa when the spacing is larger.

The operation of the invention is best explained in connection with Figure 2. The movement of the driven leaf 2 from the solid line position of Figure 2 to the dotted line position is initiated by the push rods 5 controlled by the operator. As the push rod is moved, it actuates the unison ring 4 through the connection 7. Since all the leaves 2 and 3 are pivotally connected to the unison ring 4 by the hinges 10, the leaves are all moved at the same time and in the same direction. The roller 11 of the driven leaf bears against the exhaust nozzle fairing which serves as a cam surface and drives the end of leaf 2 toward the center of the exhaust nozzle area. The ram forces from the engine coming through the exhaust tend to rotate the leaf about the roller resulting in a forward thrust on the unison ring. At the same time the ram forces act to push the leaves in an aft direction resulting in a backward thrust on the unison ring. Thus, the two forces tend to balance each other out and reduce the force required to move the unison ring.

As the driven leaf is moved outward by the unison ring 4 and inward by the roller 11, it drives the floating leaf through the base section 13 of the driven leaf and the angled end sections 16 of the floating leaf toward the center of the exhaust nozzle area. The ram forces of the engine exhaust force the floating leaf against the driven leaf.

When the leaves are in an extended position the fairing on the driven leaves and the floating leaves cooperate with the fairing on the exhaust nozzle section to present a symmetrical system. Thus, only a minimum base drag is permitted resulting in higher speeds at a given thrust.

Obviously many modifications and variations of the present invention are possible in the light of the above teachings. It is therefore to be understood that within the scope of the appended claim the invention may be practiced otherwise than as specifically described.

What is claimed is:

Apparatus for controlling the area of the exhaust nozzle of a jet engine comprising a cylindrical tube defining a combustion chamber terminating in an exhaust nozzle, a double wall casing closed at one end secured to and extending rearward from said nozzle, said casing including an annular cylindrical inner wall and an annular outer wall, a portion of said outer wall extending rearward beyond said inner wall and having a tapered inner surface, an axially reciprocable annular unison ring positioned between said walls, a plurality of circumferentially spaced outer driving leaf elements disposed longitudinally between said walls in axial alignment with said unison ring, a plurality of circumferentially spaced inner driven leaf elements interposed between and inwardly of said outer leaf elements, the lateral edge portions of each of said outer leaves overlying the adjacent edges on said inner leaves, said inner and outer leaf elements cooperating to form a substantially annular member, hinge means secured to and in axial alignment with said unison ring and said leaves for permitting inward tilting of said leaves, a roller mounted at substantially the center of each of said driving leaves and bearing against the inner surface of said outer wall so that longitudinal, rearward movement of said rollers on said tapered surface forces said leaves to tilt toward the center of the nozzle to reduce its area, and a curved fairing element on the outer surface of each leaf that follows the contour of said outer wall extending from its rearward end to substantially the center of said leaf, the lateral edge portion on said fairing elements on said driving leaves overlying those on the driven leaves, said fairing on said driven leaves being pivoted at their forward ends to the driven leaves and being resiliently urged outwardly to hold said lateral edges in sealing engagement.

References Cited in the file of this patent

UNITED STATES PATENTS

| 2,778,190 | Bush | Jan. 22, 1957 |
| 2,779,157 | Palmer | Jan. 29, 1957 |

FOREIGN PATENTS

| 1,018,650 | France | Oct. 15, 1952 |
| 1,071,851 | France | Mar. 10, 1954 |
| 711,941 | Great Britain | July 14, 1954 |